United States Patent
Rakhmailov (10) Patent No.: US 6,546,736 B2
(45) Date of Patent: Apr. 15, 2003

(54) METHOD OF OPERATION OF GAS TURBINE ENGINE

(75) Inventor: Anatoly Rakhmailov, Bataysk (RU)

(73) Assignee: ALM Development, Inc., Washington, DC (US)

( * ) Notice: Subject to any disclaimer, the term of this patent is extended or adjusted under 35 U.S.C. 154(b) by 0 days.

(21) Appl. No.: 09/925,823

(22) Filed: Aug. 9, 2001

(65) Prior Publication Data

US 2001/0052228 A1 Dec. 20, 2001

Related U.S. Application Data

(62) Division of application No. 09/161,114, filed on Sep. 25, 1998.

(51) Int. Cl.$^7$ .............................. F02C 3/067; F02C 3/34
(52) U.S. Cl. ...................... 60/773; 60/774; 60/39.183
(58) Field of Search ........................... 60/39.41, 39.162, 60/39.511, 726, 39.183, 773, 774

(56) References Cited

U.S. PATENT DOCUMENTS

| | | | | |
|---|---|---|---|---|
| 2,409,159 A | * | 10/1946 | Singleton | 60/39.183 |
| 3,609,967 A | * | 10/1971 | Waldman | 60/39.183 |
| 3,785,145 A | * | 1/1974 | Amann | 60/39.511 |
| 3,971,210 A | * | 7/1976 | Rose | 60/726 |
| 4,426,842 A | * | 1/1984 | Collet | 60/39.511 |
| 5,148,670 A | * | 9/1992 | Birch et al. | 60/39.41 |
| 5,442,904 A | * | 8/1995 | Shnaid | 60/39.183 |

FOREIGN PATENT DOCUMENTS

FR    1166419    * 11/1958

* cited by examiner

Primary Examiner—Ted Kim
(74) Attorney, Agent, or Firm—Hughes Hubbard & Reed LLP; Ronald Abramson; Sheryl L. Sandridge (57) ABSTRACT

A method of operating a gas turbine engine comprising a power turbine mounted downstream a compressor, and a compressor turbine mounted downstream the power turbine for rotation in a direction opposite to the rotation direction of the power turbine. Exhaust fluid from the compressor turbine is cooled in a heat exchanger with a compressed fluid downstream the compressor and is then cooled with air in separate heat exchanger before being admitted to the compressor. A part of the compressed fluid heated in the heat exchanger is fed to cool the turbine blades, and the rest of the fluid is fed to a heated fluid source for the turbine. To control the gas turbine engine, a part of fluid is boosted by a booster compressor and is discharged from the engine. The booster compressor is driven by an expanding turbine that rotated under the effect of combustion air that is expanded in the expanding turbine and flows through the expanding turbine under the action of reduced pressure in the heated fluid source.

12 Claims, 5 Drawing Sheets

METHOD OF OPERATION OF GAS TURBINE ENGINE

This is a division of application Ser. No. 09/161,114, filed on Sep. 25, 1998. This application cross-references three copending U.S. patent applications, each of which was filed on Sep. 25, 1998, as U.S. patent application Ser. No. 09/161,104, now U.S. Pat. No. 6,460,343 Ser. No. 09/161,115 now U.S. Pat. No. 6,305,157 and Ser. No. 09/161,170, now U.S. Pat. No. 6,145,296 respectively, each of which copending U.S. applications is incorporated herein by reference.

The invention relates to the field of gas turbine engines, and more specifically, to gas turbines maintaining control of fluid density to control system operation and minimize losses.

BACKGROUND OF THE INVENTION

In conventional gas turbine engines having a turbine and a compressor, turbine output power is controlled by simply varying the fuel supply. When fuel supply is increased, the temperature upstream of the turbine increases, resulting in increased power and speed. This also causes an increase in pressure and in the expansion ratio. Controlling power in conventional gas turbine engines in this way does not pose any significant problems, but these engine are unable to accommodate sudden load changes because the temperature in the gas turbine engine changes over a very wide range: from 600K to 1,400K when going from idling conditions to full load. In addition, it is not possible to "scale down" a conventional gas turbine engine to obtain a lower-power, compact engine for uses such as land vehicle applications because the turbine flow duct fluid parameters would require turbine blades to be as small as ⅛ of an inch in height. With such small blades, the engine would not produce enough torque, thus requiring a gearbox and lowering overall efficiency.

These disadvantages can be partly eliminated by reducing the pressure downstream of the turbine with an exhauster. The exhauster allows the expansion ratio to be increased and the pressure upstream of the turbine to be decreased. Turbine blades can then be made larger, and consequently produce more torque than otherwise would have been possible. This does not completely solve the problem because turbine flow duct temperature fluctuations remain. Wide temperature fluctuations result in engine components incurring large thermal expansions and contractions. These deformations result in metal-to-metal clearance variations (which gives rise to losses), lower reliability, and reduced service life.

To mitigate these negative effects, a gas turbine engine can be fitted with compressors on either side of the turbine to control fluid density in the turbine flow duct. The density control range in this case is limited because the pressure would need to be increased by a factor of 100 if power is to be increased from 1 kW to 100 kW. This amount of pressure increase cannot be made rapidly, so the engine response speed will be very slow. To broaden the control range, fluid temperature can be increased as well (from 800K to 1,400K), but as mentioned above, a broad temperature range is undesirable.

Another type of prior art gas turbine engine, which has a compressor, a turbine, a compressor turbine mounted downstream of the turbine for rotation in the opposite direction, and a heat exchanger, has better efficiency because it does not use stator vanes, so losses in the flow duct are lower. If the gas turbine engine of this type has a power output of 50 kW and higher, it can be easily controlled. The temperature in the flow duct in that case varies within the range of 1,250K to 1,400K, providing milder conditions for the gas turbine engine components. If, however, an engine of this type with a power output of say, 25 kW is built with the flow duct dimensions similar to those of a 75 kW engine, flow duct fluid density becomes much lower. This engine has a compression ratio of about 1.0, and it has a narrow control range and a low response speed. If such a gas turbine engine were employed to power a land vehicle, it could not effectively accommodate the sudden load changes that are inherent in this application. Since this type of gas turbine engine is more efficient and can be made more compact to allow it to be used on land vehicles, it is highly desirable to solve this control problem.

SUMMARY OF THE INVENTION

It is therefore, an object of the invention to provide a gas turbine engine of the above-described type that can be controlled over the full range of load while maintaining high efficiency.

Another object of the invention is to provide a gas turbine engine that is more reliable in operation.

The foregoing objects are accomplished through the design of a gas turbine engine having a turbine, a compressor turbine mounted downstream of the turbine and which rotates in a direction opposite to the rotation of the turbine. Exhaust fluid from the compressor turbine is cooled in a heat exchanger using a compressed fluid downstream of the compressor and is then cooled with air in a separate heat exchanger before being admitted to the compressor. A part of the compressed fluid heated in the heat exchanger is fed to cool the turbine blades, and the rest of the fluid is fed to a heated fluid source for the turbine. To control the gas turbine engine, the pressure of part of the fluid is increased by a booster compressor and the fluid is discharged from the engine. The booster compressor is driven by an expanding turbine that rotates under the effect of combustion air that is expanded in the expanding turbine. The combustion air flows through the expanding turbine under the action of reduced pressure in the heated fluid source.

Other objects and advantages of the invention will become apparent from the following detailed description of the preferred embodiments thereof and accompanying drawings.

DETAILED DESCRIPTION OF THE DRAWINGS

Figure 1:
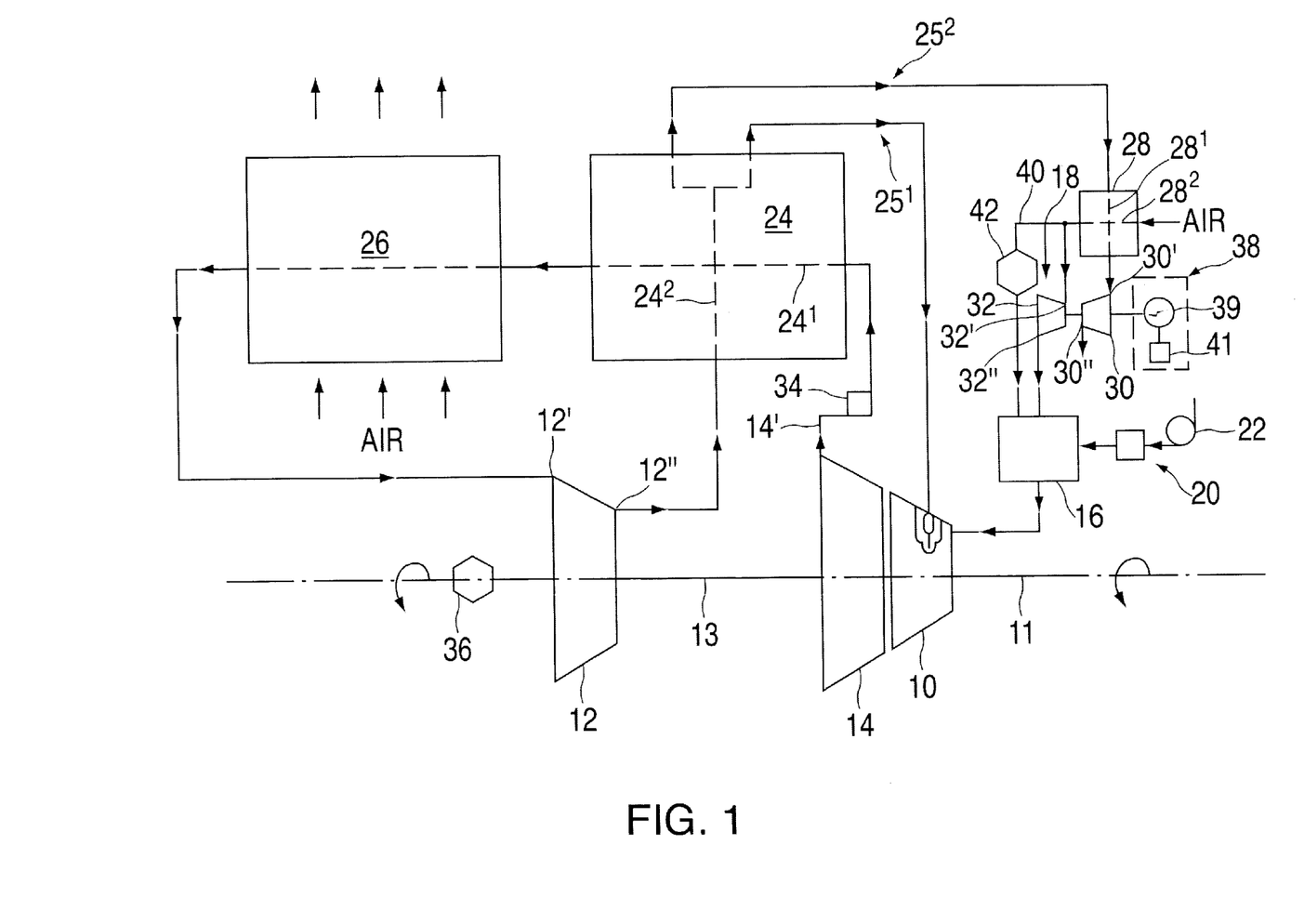
FIG. 1 is a block-diagram of a gas turbine engine according to the invention.

In FIG. 1, a gas turbine engine has a turbine 10 that has a rotor disk rotating on an independent shaft 11 and a compressor 12 driven by a compressor turbine 14 rotating on an independent shaft 13. Compressor turbine 14 is mounted for rotation in a direction opposite to the direction of rotation of turbine 10, and turbine 10 is mounted downstream of compressor 12 and upstream of compressor turbine 14. Turbine 10 is designed to drive a load (not shown). The gas turbine engine has a combustor 16 to produce a heated fluid. The heated fluid source 16 is connected to a combustion air source 18 and to a fuel source 20, which has a fuel pump 22.

The gas turbine engine has a first heat exchanger 24 containing a first circuit $24^1$, a second circuit $24^2$, a first outlet line $25^1$ and a second outlet line $25^2$ of second circuit $24^2$. The gas turbine engine has a second heat exchanger 26. First circuit $24^1$ of first heat exchanger 24 is connected to an outlet 14' of compressor turbine 14 to receive fluid from the compressor turbine to obtain a primary cooled waste fluid flow and to a second heat exchanger 26 to additionally cool the fluid to obtain a secondary cooled waste fluid flow. Second heat exchanger 26 is connected to an inlet 12' of compressor 12, which compresses the fluid that has been cooled in first circuit $24^1$ (primary cooled fluid) of first heat exchanger 24 and additionally cooled with air in second heat exchanger 26 (secondary colled fluid). Secondary fluid cooling is necessary to bring the fluid temperature to a level suitable for compressor 12. This additional cooling also lowers the work of compression and improves efficiency.

An outlet 12" of compressor 12 is connected to second circuit $24^2$ of first heat exchanger 24. Fluid coming from outlet 14' of compressor turbine 14 is cooled with the fluid that was cooled in first circuit $24^1$ of first heat exchanger 24 and in second heat exchanger 26. At the same time, the fluid that comes from outlet 12" of compressor 12 is heated with the fluid (exhaust gases) that comes from outlet 14' of compressor turbine 14. First outlet line $25^1$ of second circuit $24^2$ of first heat exchanger 24 is connected to turbine 10 for cooling purposes.

The gas turbine engine has a third heat exchanger 28 that has a first circuit $28^1$ and a second circuit $28^2$. Second outlet line $25^2$ of second circuit $24^2$ of first heat exchanger 24 is connected to first circuit $28^1$ of third heat exchanger 28 for cooling with air. First circuit $28^1$ of third heat exchanger 28 is connected to an inlet 30' of an evacuating compressor 30 that has an outlet 30" which vents to the atmosphere. Because fluid in the fluid flow system of this gas turbine engine is under sub-atmospheric pressure, venting a part of the fluid from outlet 12" of compressor 12 through second circuit $24^2$ of heat exchanger 24 requires a pressure boost to expel the fluid to the atmosphere. A fluid under a reduced pressure can only be discharged into the atmosphere if the pressure of the fluid is above the atmospheric pressure. Fluid that comes from outlet line $25^2$ to evacuating compressor 30 has to be cooled in third heat exchanger 28 before compression to facilitate its compression in the first place and also to heat combustion air as described below. The gas turbine engine has an expanding turbine 32 that has an inlet 32' and outlet 32". Inlet 32' of expanding turbine 32 is connected to atmosphere through second circuit $28^2$ of third heat exchanger 28. The air that is used to cool fluid flow coming from outlet line $25^2$ to evacuating compressor 30 is heated in second circuit $28^2$ of third heat exchanger 28 and is fed to inlet 32' of expanding turbine 32 and is fed from outlet 32" of turbine 32 to the source of the heated fluid 16. When the air expands in turbine 32, the turbine rotates and drives evacuating compressor 30. When fuel is fed by fuel pump 22 to source of the heated fluid 16 and is mixed with combustion air fed from outlet 32" of expansion turbine 32, fuel is burned to form the heated fluid that is fed to turbine 10 to perform useful work and to drive a load (not shown) and to drive compressor turbine 14, completing the cycle.

Variable speed turbine efficiencies vary according to a number of parameters, including engine speed. In prior art gas turbines of this type, when turbine speed decreases and the power output remains unchanged, such as in the case of where a vehicle travels up a slope, compressor speed and power will increase, and much more fluid than necessary will be supplied to the turbine. The engine consequently becomes "overcooled," the cycle temperature drops, and contraction of metal parts occurs. As a result, turbine power output decreases and efficiency is reduced.

When turbine speed remains unchanged and the power output decreases, such as in the case of where a vehicle travels down a slope, compressor speed decreases to a great extent and the turbine experiences a shortage of fluid. The engine thus becomes "overheated," which poses risks to turbine engine components due to metal overheating and excessive expansion.

During overcooling, the compressor turbine has an excess of power that floods the turbine with fluid. During overheating, there is a shortage of power at the compressor turbine, and the turbine receives less fluid than it needs, leading to overheating. Thus, temperature is a critical parameter to control in engines of this type.

The above description shows that in the former case, the compressor turbine has an excess of power that, if left uncontrolled, can result in "overcooling" of the turbine. In the latter case, there is a shortage of power at the compressor turbine, which can result in the engine being dangerously overheated. Both phenomena would be normally counteracted by controlling fluid flow to the compressor turbine or by controlling fluid flow to the turbine. In both cases, control is accompanied by losses. To avoid these condition without controlling flow, temperature at the outlet of the compressor turbine must be kept constant. In order to do this, a temperature sensor 34, such as a thermocouple, is positioned at outlet 14' of compressor turbine 14 to monitor temperature at this point in the flow duct. Temperature sensor 34 feeds a signal to a control device (not shown) that controls an electric load 36, which is mechanically coupled to compressor 12. The electric load may comprise an electric generator and an electrical consumer connected to the generator. The load on the generator is controlled by the control device in such a manner as to decrease the power load on the generator when the speed of compressor 12 decreases and the temperature at outlet 14' increases. When temperature at outlet 14' decreases, the load on the generator, which is a part of electric load 36, increases to take-off some power from compressor turbine 14 and to reduce the compressor speed. This allows the temperature at outlet 14' of compressor turbine 14 to be controlled, i.e., that the temperature is kept substantially constant. The gas turbine engine is thus protected against overheating. If the temperature at point 14' is kept substantially constant, the temperature of turbine 10 will be more stable. This improves control of the gas turbine engine because clearances are kept within certain stable limits. The control system that connects electric load 36 and temperature sensor 34 is not described in detail herein as it does not have a direct bearing on this invention, but is disclosed in greater detail in my co-pending patent application Ser. No. 09/632,734, and that description is incorporated in full herein.

Figure 2:
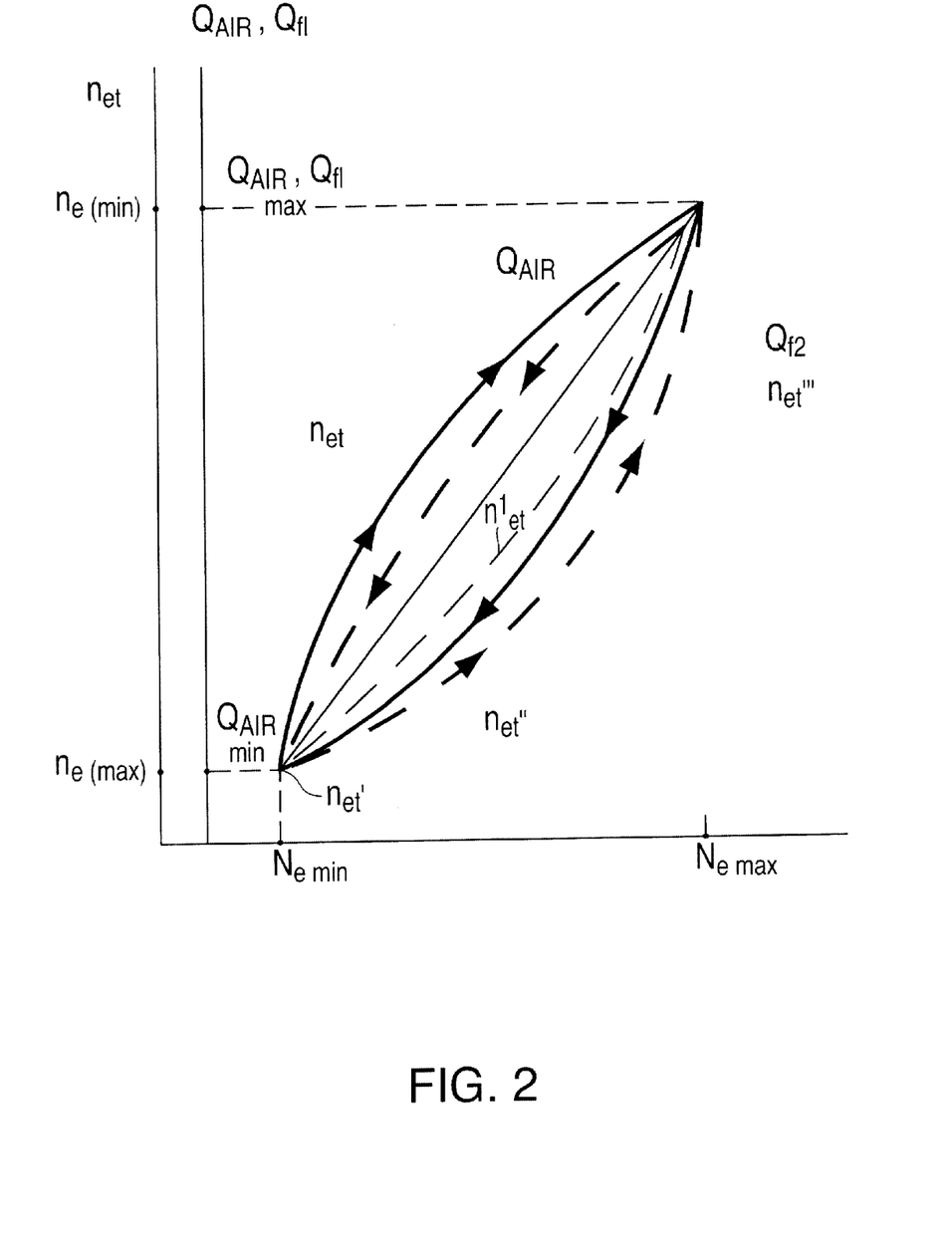
FIG. 2 is a chart explaining the gas turbine engine control mechanism according to the invention.

The gas turbine engine according to the invention has a control device 38 for controlling the speed of expanding turbine 32. As shown in FIG. 2, which represents the relationships of the speed net of expanding turbine 32, the flow of combustion air $Q_{air}$, and the flow of fluid $Q_{fl}$ of evacuating compressor 30 vs. the power output $N_e$ of turbine 10, the speed $n_{et}$ of expanding turbine 32 is at its maximum when turbine 10 idles, and the combustion air flow $Q_{air}$ is at its minimum, since the lower the expanding turbine speed, the greater the flow through the turbine.

To increase the power output of turbine 10, it is necessary that the following conditions be met:
  the flow of the combustion air has to be increased according to an increase in the fuel supply;
  density of the fluid in the flow duct has to be increased.

As shown in FIG. 2, to increase the power output of turbine 10, the speed $n_{et}$ of expansion turbine 32 has to be reduced. This reduction results in the air flow for combustion being increased, and the fluid flow $Q_{fl}$ that is discharged from the flow duct through second outlet line $25^2$ and evacuating compressor 30 decreases. This control is accomplished by any appropriate known device that is capable of lowering the speed of expanding turbine 32. It is preferred that this device be made as a rotating electric machine 39 that is mechanically coupled to expanding turbine 32. It is preferred that the expanding turbine be mechanically coupled to the evacuating compressor, such as by having a common shaft with the compressor. This electric machine is electrically coupled to a control unit 41 for controlling the speed of electric machine 39. It is understood that the electric machine can be of any type that can function as an electric generator and an electric motor, depending on switching. When the electric machine functions as a generator to a certain electric load, it will decelerate the expansion turbine (and the evacuating compressor) to lower the speed and to change the flow of fluid moving through the turbine or compressor. When the electric machine functions as a motor (if disconnected from the electric load and connected to a power supply), it will drive the evacuating compressor (and the expansion turbine) to change the flow of fluid. These functions of the electric machine are performed under control of the control unit 41 in a known per se manner. The manner in which the electric machine is controlled and the design of the control unit do not have a direct bearing on the present invention and are well known to those skilled in the art.

When turbine 10 is idling, and the speed net of expanding turbine 32 is at its maximum, the electric machine 39, which functions as a generator at no-load, rotates at full speed equaling $n_{et}'$. To lower the speed of expanding turbine 32 to a value $n_{et}''$ (to increase the power output of turbine 10), the electric load on electric machine 39 must be increased. An increase in the electric load on electric machine 39 results in a decrease in the speed of expanding turbine 32. This causes an increase in the flow of combustion air ($Q_{air}$) and a decrease in the quantity of the fluid ($Q_{fl}$) that is discharged from the flow duct (see $n_{et}'''$ in FIG. 2). If the gas turbine engine is running at full power and it becomes necessary to decrease the power output of turbine 10 (emergency braking), the load on electric machine 39 has to be completely removed, and power has to be supplied to electric machine 39. This will result in a rapid increase in the speed of expanding turbine 32 as shown at $n_{et}^1$ in FIG. 2. The increase in the speed of turbine 32 results in a sudden increase in resistance to the flow of combustion air through turbine 32. Evacuating compressor 30, which rotates at full speed, discharges more fluid from the flow duct into atmosphere to cause a rapid decrease in density of the fluid in the flow duct, thus lowering the power output of turbine 10 to a minimum. For a rapid increase in the power output of turbine 10 (acceleration) it is necessary to rapidly increase the quantity of combustion air with a concurrent decrease in fluid discharge from the flow duct. When turbine 10 is idling, fluid density in the flow duct is at its minimum, and a pressure reduction in heated fluid source 16 is at its maximum. To achieve a rapid increase in the quantity of the combustion air and to increase fluid density in the flow duct, it is necessary to divert the air flow from expanding turbine 32. This is done by providing a bypass line 40. This bypass line 40 can substantially improve control capabilities as will be seen below.

Let us now describe operation of the gas turbine engine control as applied to a land vehicle.

When the vehicle is not moving, the gas turbine engine is idling. To accelerate the vehicle, the load on electric machine 39 is increased, and the speed of expanding turbine 32 decreases. The flow of combustion air increases. At the same time, less fluid is discharged from the flow duct (outlet line $25^2$) as the speed of evacuating compressor 30 also decreases, and fluid density in the flow duct increases. This results in a gradual increase in turbine 10 power output. In this mode, the electric load (not shown) on electric machine 39 is at its maximum, and the electric machine generates power. To reduce vehicle speed (to come to a stop or to slow down when the vehicle moves on a downgrade), the electric load on electric machine 39 is gradually reduced. This results in an increase in the speed of expanding turbine 32 and evacuating compressor 30, combustion air flow decreases, and more fluid is discharged from the flow duct. This results in a gradual decrease in the power output of turbine 10. To accelerate the vehicle rapidly, flow control 42 in bypass line 40 is fully opened. At the same time, full electric load is applied to electric machine 39. Combustion air is fed mainly through the bypass line to heated fluid source 16, and the expanding turbine 32 speed rapidly decreases. Evacuating compressor 30 speed also decreases, and the quantity of the fluid that is discharged from the flow duct decreases. Thus, there is a rapid increase in combustion air supply and a rapid increase in fluid density in the flow duct. The power output of turbine 10 consequently increases rapidly.

In the embodiment of the invention shown in FIG. 3, the gas turbine engine is designed and functions in the same manner as the gas turbine engine described with reference to FIG. 1. The difference in this figure is that the fluid from outlet 12''' of compressor 12 is discharged to the atmosphere directly from outlet 30'' of evacuating compressor 30 without being cooled in a heat exchanger. This is possible owing to provision of third circuit $24^3$ in first heat exchanger 24. This design is more compact and can be used in a restricted space. Except for this differential, this embodiment functions in the same manner as the prior described embodiment.

Figure 3:
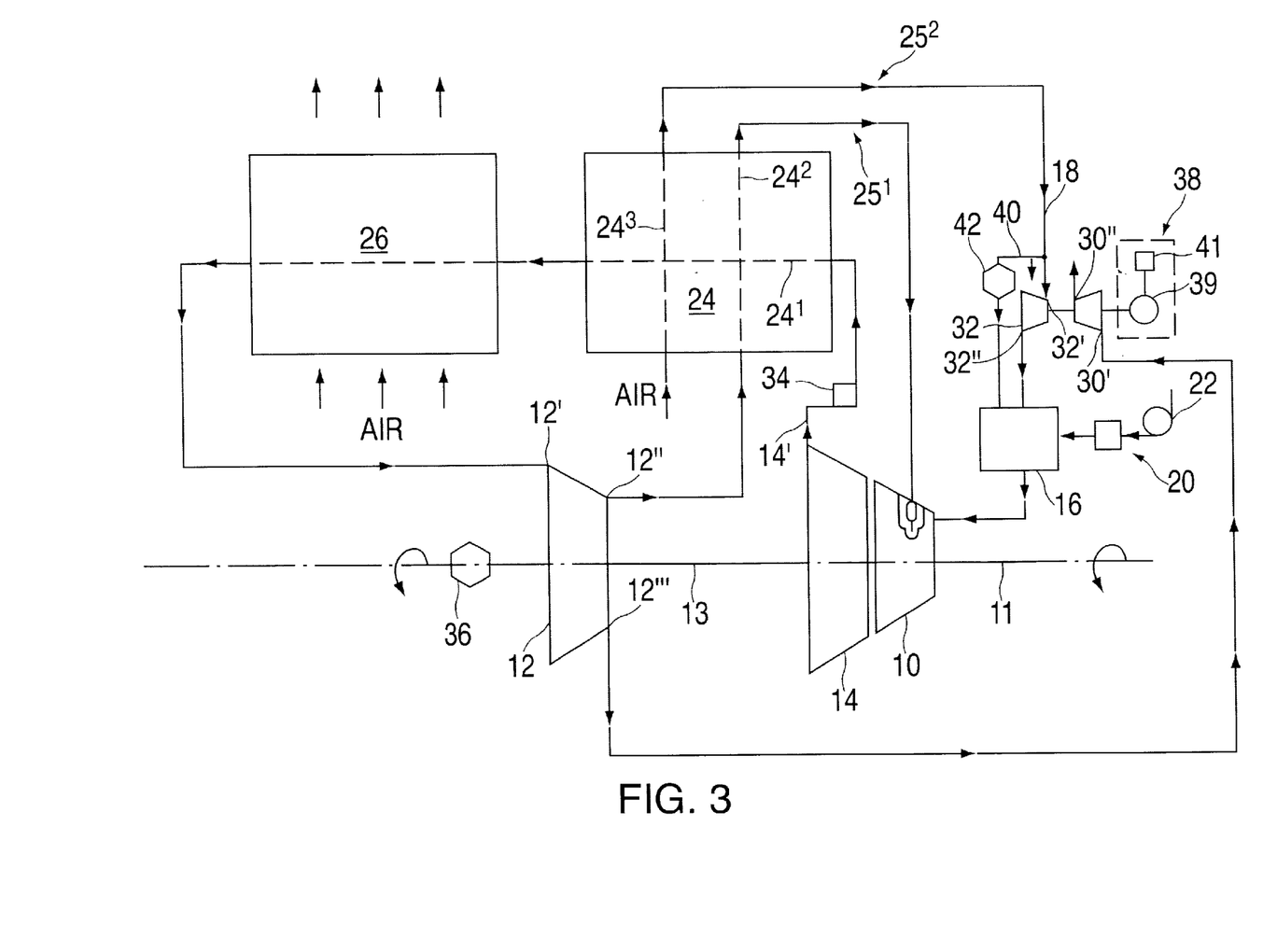
FIG. 3 is an embodiment of a gas turbine engine according to the invention.
Figure 4:
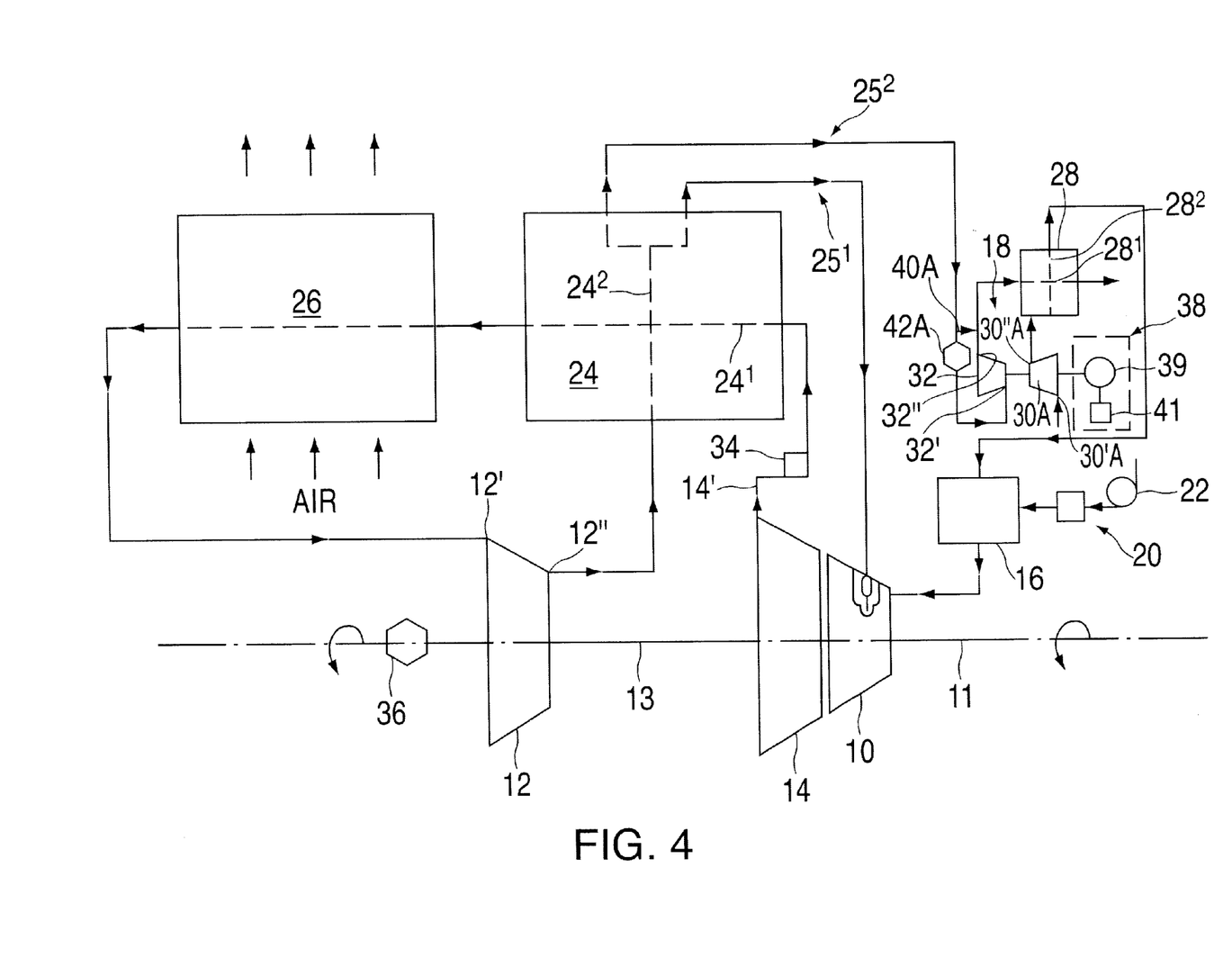
FIG. 4 is another embodiment of a gas turbine engine according to the invention.

The embodiment shown in FIG. 4 differs from the embodiments shown in FIGS. 1 and 3 by the fact that, instead of being expanded, the combustion air is compressed by an air compressor 30A, is heated in second circuit $28^2$ of third heat exchanger 28, and is fed to heated fluid source 16. The fluid coming from second outlet line $25^2$ of first heat exchanger 24, instead of being compressed, is expanded in expanding turbine 32, is cooled in first circuit $28^1$ of first heat exchanger 28 and then discharged to the atmosphere. This embodiment can be used for a more compact gas turbine engine of higher power output.

When the gas turbine engine is idling, a flow control device 42A of a bypass line 40A is open. Expansion turbine 32 runs at a low speed and discharges a small quantity of the fluid from the flow duct. Air compressor 30A functions at a minimum speed and supplies a minimum quantity of combustion air to heated fluid source 16. To increase the power output of turbine 10, flow control device 42A of bypass line 40A is shut off, expansion turbine 32 speed increases, and air compressor 30A speed also increases. Increasing expansion turbine 32 speed in this embodiment results in an increase in pressure, and hence, density of the fluid in the flow duct, which, in combination with an increase in the quantity of combustion air, results in an increase in turbine 10 power output. To accelerate the gas turbine engine more rapidly, power is supplied to electric machine 39 thus increasing both expansion turbine and air compressor speed.

Figure 5:
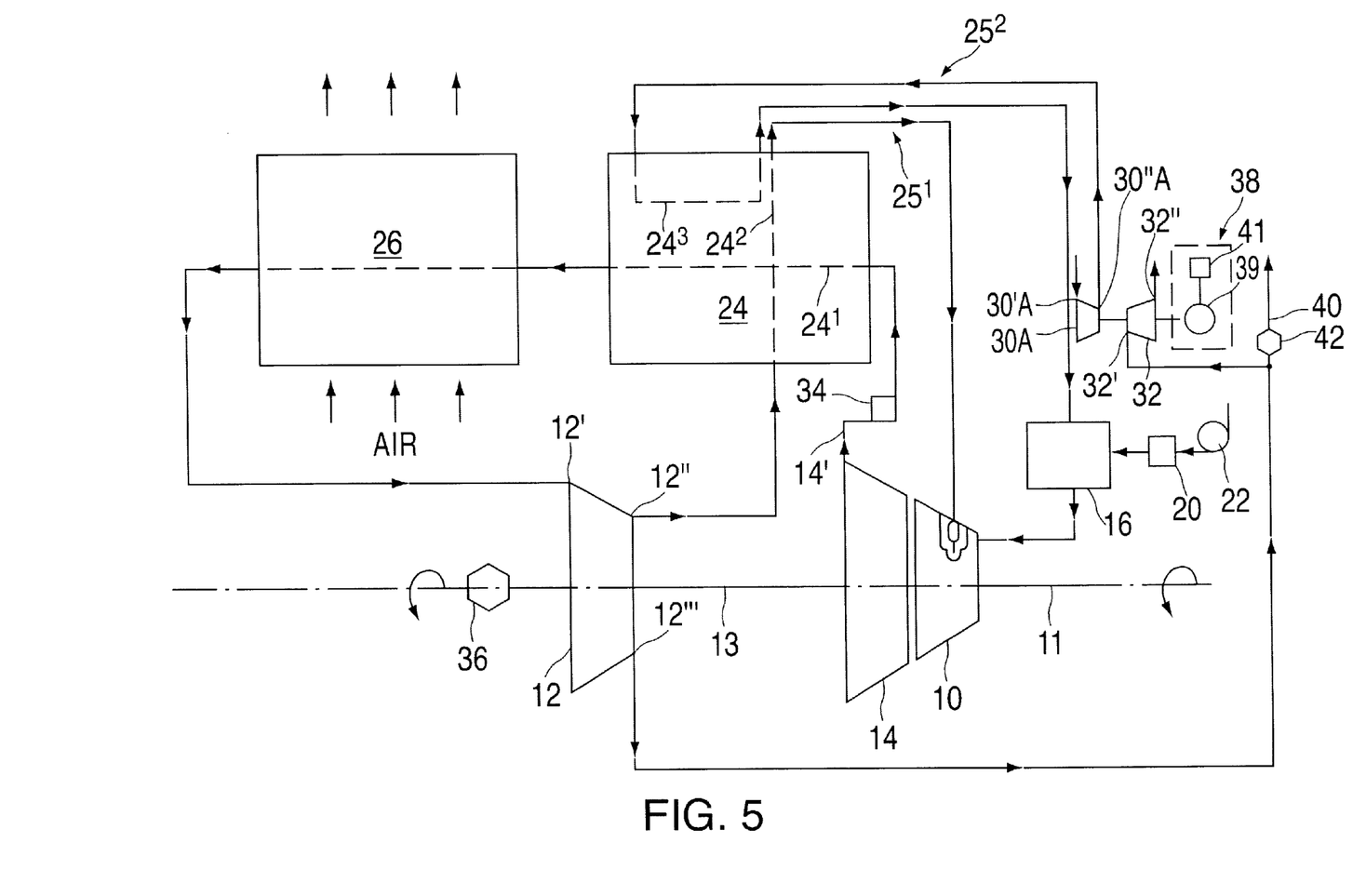
FIG. 5 is a further embodiment of a gas turbine engine according to the invention.

The embodiment shown in FIG. 5 differs from the embodiment shown in FIG. 4 because waste fluid from outlet 12''' of compressor 12 is not subjected to a he exchange (cooling and heating) and is expanded before being discharged to the atmosphere. This embodiment is more compact, although it is not as efficient as that shown in FIG. 4. The difference in control in this embodiment is that electric machine 39 has to be more powerful, because the energy content of the waste fluid that has to discharged is lower than in the embodiment described with reference to FIG. 4.

The invention was described with reference to the preferred embodiments. Various changes and modifications can be made, however, without going beyond the spirit and scope of the invention as defined in the attached claims.

Thus the expanding turbine and the evacuating (or air) compressor can be controlled independently. The electric load on the compressor can be replaced by a hydraulic load with a hydraulic pump. Instead of the rotating electric machine, the expanding turbine can be provided with stator vanes to control the flow through the expanding turbine, thus varying its speed and controlling operation of the evacuating (or air) compressor.

I claim:

1. A method of operation of a gas turbine engine having a compressor, a power turbine that has turbine blades and is mounted downstream of said compressor, a compressor turbine mounted downstream of said power turbine for rotation in a direction opposite to the rotation direction of said power turbine, a heated fluid source provided upstream of said power turbine, and a fuel source connected to said heated fluid source, said method comprising:
   a) preparing said heated fluid in said heated fluid source by combusting said fuel using combustion air to obtain said heated fluid and feeding said heated fluid to said power turbine and to said compressor turbine, whereby a waste fluid flow is obtained downstream of said compressor turbine, said waste fluid flow having a temperature;
   b) cooling said waste fluid flow to obtain a primary cooled waste fluid flow;
   c) additionally cooling said primary cooled waste fluid flow to obtain a secondary cooled waste fluid flow;
   d) compressing said secondary waste fluid flow in said compressor to obtain a compressed waste fluid flow;
   e) steps for controlling the density of a fluid flow entering said source of heated fluid and supplying said controlled density fluid flow to said source of heated fluid.

2. The method of claim 1, further comprising steps for supplying a part of said compressed waste fluid flow to said power turbine.

3. The method of claim 2 wherein said steps for supplying a part of said compressed waste fluid flow to said power turbine comprise:
   a) feeding said compressed waste fluid flow to a heat exchanger for cooling said waste fluid flow that is obtained downstream of said compressor turbine, to obtain a heated compressed fluid flow;
   b) dividing said heated compressed fluid flow into at least two partial flows of heated waste fluid;
   c) feeding one of said at least two partial flows of heated waste fluid to said power turbine blades for expanding and heating one of said at least two partial flows of heated waste fluid.

4. The method of claim 3 wherein said steps for controlling the density of said fluid flow entering said source of heated fluid and supplying said controlled density fluid flow to said source of heated fluid comprise:
   a) cooling a remaining one of said at least two partial flows of heated waste fluid to obtain a flow of cooled waste fluid, boosting the pressure of said flow of cooled waste fluid to obtain a boosted flow of waste fluid, and venting said boosted waste fluid flow into the atmosphere;
   b) heating said combustion air to obtain a flaw of heated combustion air and feeding said flow of heated combustion air to said heated fluid source;
   c) controlling said temperature of said waste fluid flow;
   d) controlling said boosted waste fluid flow;
   e) controlling said flow of heated combustion air.

5. The method of claim 4 further comprising expanding said flow of heated combustion air in an expanding turbine to perform work and using said work for said boosting of said remaining one of said at least two partial flows of said cooled waste fluid flow.

6. The method of claim 3 wherein said steps for controlling the density of said fluid flow entering said source of heated fluid and supplying said controlled density fluid flow to said source of heated fluid comprise:
   a) cooling a remaining one of said at least two partial flows of heated waste fluid to obtain a flow of cooled waste fluid and venting said flow of cooled waste fluid to the atmosphere;
   b) compressing said combustion air to obtain a compressed flow of combustion air, heating said compressed flow of combustion air to obtain a flow of heated combustion air, and feeding said flow of heated combustion air to said heated fluid source;
   c) controlling said temperature of said waste fluid flow;
   d) controlling said cooled waste fluid flow;
   e) controlling said flow of heated combustion air.

7. The method of claim 6, said method further comprising expanding said remaining one of said at least two partial flows of heated waste fluid in an expanding turbine to perform work and using said work for compressing said combustion air.

8. The method of claim 2 wherein said steps for supplying a part of said compressed waste fluid flow to said power turbine comprise:
   a) dividing said compressed waste fluid flow into at least two partial flows of compressed waste fluid;
   b) feeding one of said at least two partial flows of compressed waste fluid to a beat exchanger for cooling said waste fluid flow obtained downstream of said compressor turbine, to obtain a heated waste fluid flow;
   c) feeding said heated waste fluid flow to said turbine blades for expanding and heating said heated waste fluid flow.

9. The method of claim 8 wherein said steps for controlling the density of said fluid flow entering said source of heated fluid and supplying said controlled density fluid flow to said source of heated fluid comprise:
   a) boosting the pressure of a remaining one of said at least two partial flows of compressed waste fluid to obtain a boosted waste fluid flow and venting said boosted waste fluid flow into atmosphere;

b) heating said combustion air, expanding said combustion air after said heating, and feeding said combustion air to said heated fluid source;

c) controlling said temperature of said waste fluid flow;

d) controlling said boosted waste fluid flow;

e) controlling said flow of heated combustion air.

10. The method of claim 9, said meted further comprising expanding said flow of heated combustion air in an expanding turbine to perform work and using said work for said boosting of said remaining one of said at least two partial flows of compressed waste fluid.

11. The method of claim 8 wherein said steps for controlling the density of said fluid flow entering said source of heated fluid and supplying said controlled density fluid flaw to said source of heated fluid comprise:

a) venting a remaining one of said at least two partial flows of compressed waste fluid to the atmosphere;

b) compressing said combustion air to obtain a compressed flow of combustion air, heating said compressed flow of combustion air to obtain a flow of heated combustion air, and feeding said flow of heated combustion air to said heated fluid source;

c) controlling said temperature of said waste fluid flow;

d) controlling said remaining one of said at least two partial flows of compressed waste fluid before said venting of said remaining one of said at least two partial flows of compressed waste fluid to the atmosphere;

e) controlling said flow of heated combustion air.

12. The method of claim 11, said method further comprising expanding said remaining one of said at least two partial flows of heated waste fluid in an expanding turbine to perform work and using said work for compressing said combustion air.

* * * * *